(12) United States Patent
Moidu

(10) Patent No.: US 8,134,277 B2
(45) Date of Patent: Mar. 13, 2012

(54) ELECTROSTATIC COMB ACTUATOR

(76) Inventor: Abdul Jaleel K. Moidu, Nepean (CA)

( * ) Notice: Subject to any disclaimer, the term of this patent is extended or adjusted under 35 U.S.C. 154(b) by 300 days.

(21) Appl. No.: 12/638,160

(22) Filed: Dec. 15, 2009

(65) Prior Publication Data

US 2011/0140569 A1  Jun. 16, 2011

(51) Int. Cl.
*H02N 1/00* (2006.01)
(52) U.S. Cl. .................................................. 310/309
(58) Field of Classification Search .................. 310/300, 310/309, 40 MM
See application file for complete search history.

(56) References Cited

U.S. PATENT DOCUMENTS

| | | | |
|---|---|---|---|
| 5,212,582 A | 5/1993 | Nelson | 359/224.1 |
| 5,640,133 A | 6/1997 | MacDonald et al. | 333/197 |
| 6,744,173 B2 | 6/2004 | Behin et al. | 310/309 |
| 6,758,983 B2 | 7/2004 | Conant et al. | 216/2 |
| 6,767,614 B1 | 7/2004 | Hofmann et al. | 428/166 |
| 7,071,109 B2 | 7/2006 | Novotny et al. | 438/692 |
| 7,081,982 B2 | 7/2006 | Shimazu et al. | 359/298 |
| 7,098,571 B2 | 8/2006 | Adams et al. | 310/309 |
| 7,239,774 B1 | 7/2007 | Stowe et al. | 385/19 |
| 7,261,826 B2 | 8/2007 | Adams et al. | 216/2 |
| 7,445,723 B2 | 11/2008 | Lee et al. | 216/24 |
| 7,453,182 B2 * | 11/2008 | Kouma et al. | 310/309 |
| 7,573,022 B2 | 8/2009 | Choo et al. | 250/234 |
| 7,719,162 B2 * | 5/2010 | Min et al. | 310/309 |
| 2003/0019832 A1* | 1/2003 | Conant et al. | 216/2 |
| 2003/0048036 A1* | 3/2003 | Lemkin | 310/309 |
| 2006/0284514 A1* | 12/2006 | Ko et al. | 310/309 |
| 2008/0197748 A1* | 8/2008 | Naftali et al. | 310/309 |

OTHER PUBLICATIONS

Jung et al., "High fill-factor two-axis gimbaled tip-tilt-piston micromirror array actuated by self-aligned vertical electrostatic combdrives", Journal of Microelectromechanical System, vol. 15, No. 3, pp. 563-571, Jun. 2006.

* cited by examiner

*Primary Examiner* — Nguyen N Hanh
(74) *Attorney, Agent, or Firm* — Teitelbaum & MacLean; Neil Teitelbaum; Doug MacLean

(57) ABSTRACT

An electrostatic comb actuator having reduced in-plane rotation of a tiltable element is disclosed. The actuator has a stator comb electrode and a tiltable rotor comb electrode. The rotor comb electrode fingers extend from an anchor wall running parallel to the axis of rotation of the rotor at a first distance from the axis of rotation. The rotor comb electrode fingers extend towards the axis of rotation for a length that is smaller than the first distance. The stator electrodes are shifted towards the axis of rotation, so that the stator electrode fingers are only partially overlapping with the rotor electrodes fingers.

20 Claims, 8 Drawing Sheets

ELECTROSTATIC COMB ACTUATOR

TECHNICAL FIELD

The present invention is related to electrostatic actuators, and in particular to electrostatic comb actuators with reduced in-plane rotation of a tiltable element.

BACKGROUND OF THE INVENTION

An electrostatic actuator is an electromechanical device having a static electrode and a movable electrode, for exerting a controllable movement of the movable electrode relative to the static electrode, upon applying a driving voltage between the static and the movable electrodes. In actuators for exerting angular movement, the static and the movable electrodes are commonly called "stator" and "rotor", respectively.

Perhaps the simplest electrostatic actuator is a pair of planar parallel plates, one being the stator and the other being the rotor. As the actuating voltage is applied, the plates attract each other generating an actuating force. The actuating force causes the rotor plate to tilt, bringing it closer to the stator plate. Although simple, a parallel-plate electrostatic actuator suffers from drawbacks, such as a non-linear dependence of the actuating force on the driving voltage, and the generation of a relatively small actuating force. Another well-known type of an electrostatic actuator is a so-called "comb" actuator. In a comb actuator, the rotor and the stator are made in the form of combs, or stacks, comprising planar parallel plates separated by a distance that is larger than thickness of the plates. When the actuating voltage is applied to the rotor and the stator combs, they attract each other generating a stronger actuating force than the plates of a two-plate actuator.

A micro-electromechanical system (MEMS) is a micro-sized mechanical structure having electrical circuitry fabricated together with the device by using microfabrication processes mostly derived from integrated circuit fabrication processes. The developments in the field of MEMS process engineering enabled batch production of electrostatic MEMS comb actuators that can be used in visual displays, optical attenuators and switches, and other devices. When a MEMS device is actuated, a micromirror supported by the MEMS device is tilted about a working axis, which makes an optical beam falling thereupon to steer from one output optical port to another, thereby realizing the switching function. By having a plurality of output ports disposed along a single line, a multiport optical switch can be constructed.

Referring to FIGS. 1A and 1B, a prior-art MEMS comb actuator 10 is shown in plan and side views, having a flexibly suspended rotor 11 with rotor plates 12 and a stator 13 with stator plates 14. The rotor and the stator plates 12 and 14 are "interdigitated", that is, they are brought together such that the rotor plates 12 and the stator plates 14 are parallel to each other and overlap laterally without contacting each other, as shown in FIGS. 1A and 1B. A tilt axis 15 of the rotor 11 is perpendicular to the planes of the rotor and the stator plates 12 and 14. When a voltage is applied between the rotor plates 12 and the stator plates 14, the rotor and the stator plates 12 and 14 attract each other so as to increase the lateral overlap of the rotor 11 and the stator 13, by tilting the rotor 11 about the axis 15 in a direction of an arrow 19. Since the tilt axis 15 is perpendicular to the planes of the rotor and the stator plates 12 and 14, the plates 12 and 14 remain generally parallel during rotation of the rotor 11. As a result, almost linear actuation at a relatively high actuating force is produced by the MEMS comb actuator 10, sufficient for tilting a MEMS micromirror 11A supported by the rotor 11.

Unfortunately, the comb actuator 10, when used in a micromirror array application, has a serious drawback that outweighs its general advantage of a large force and linear actuation mentioned above. To perform as described above, the rotor 11 and the stator 13 of the MEMS comb actuator 10 have to be precisely aligned with respect to each other, with a precision of a few microns or better. Even a slight misalignment results in the rotor and the stator plates 12 and 14 attracting to each other laterally as shown by arrows 16 in FIG. 1A, which can cause turning of the rotor 11 about an axis 17 in a direction shown by an arrow 18. When the rotor 11 turns about the axis 17, the MEMS micromirror 11A supported by the rotor 11 turns in its own plane about the same axis 17 and collides with a neighboring micromirror, not shown, of the MEMS micromirror array, causing a catastrophic failure of the MEMS micromirror array.

The prior art is lacking a simple and efficient electrostatic comb actuator having suppressed in-plane rotation of a flexibly suspended rotor. Accordingly, it is a goal of the present invention to provide a comb actuator having lessened in-plane rotation of the rotor, and/or lessened sensitivity to rotor-stator misalignment, without a considerable reduction of magnitude of the electrostatic force produced by the actuator.

SUMMARY OF THE INVENTION

In accordance with the invention there is provided an electrostatic comb actuator comprising:
 a substrate;
 a stator electrode including a stator finger extending from the substrate; and
 a rotor electrode pivotally mounted over the substrate for rotation about a first axis parallel to the substrate upon applying a voltage between the rotor and the stator electrodes, the rotor electrode including
  an anchor wall running parallel to the first axis at a first distance therefrom, and
  a rotor finger extending from the anchor wall toward the first axis for a second distance smaller than the first distance,
 wherein the stator finger is disposed closer to the first axis than the anchor wall, to enable the rotor finger to rotate about the first axis without the stator finger contacting the anchor wall.

In accordance with another aspect of the invention there is further provided an electrostatic comb actuator comprising:
 a substrate;
 a tiltable platform pivotally mounted over the substrate for tilting about a first axis parallel to the substrate, the platform comprising:
  a hinge mounted on the substrate for tilting the tiltable platform about the first axis,
  a support beam extending from the hinge substantially perpendicular to the first axis, and
  an anchor wall extending from the support beam, the anchor wall running parallel to the first axis at a first distance therefrom;
 a stator electrode having a stator finger extending from the substrate toward the tiltable platform; and
 a rotor electrode having a rotor finger extending from the anchor wall toward the first axis for a second distance smaller than the first distance,
 wherein the tiltable platform is pivotally mounted for rotation upon applying a voltage between the stator and the rotor electrodes, and wherein the stator finger is disposed closer to the first axis than the anchor wall, so as to leave a horizontal clearance between the stator finger and the anchor wall to enable rotation therebetween.

In accordance with another aspect of the invention there is further provided a tiltable MEMS micromirror device having a micromirror and the electrostatic comb actuator of the present invention for tilting the micromirror.

In accordance with yet another aspect of the invention there is further provided a linear array of the tiltable MEMS micromirror devices of the present invention.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
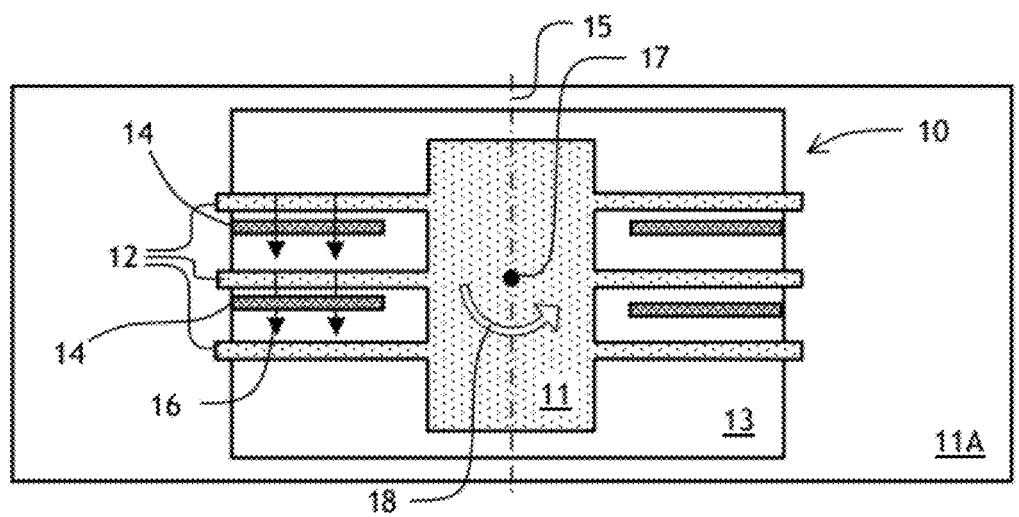
FIGS. 1A and 1B are plan and side views, respectively, of a prior-art comb actuator.
Figure 1B:
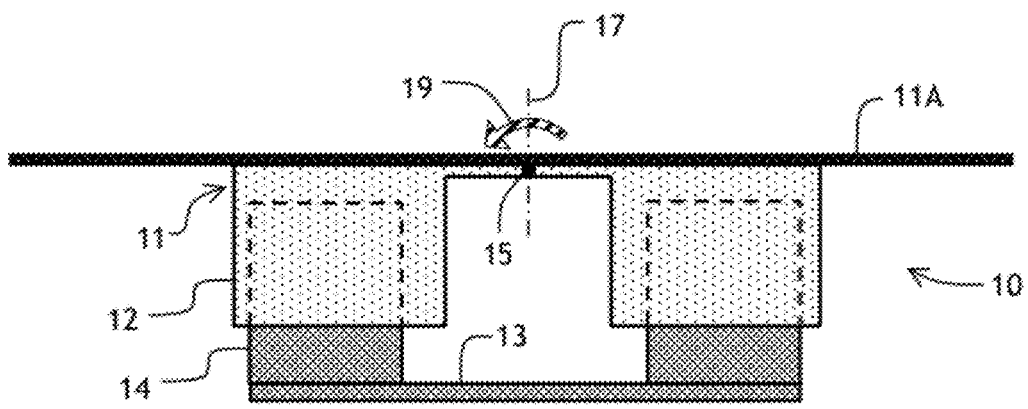
Figure 2A:
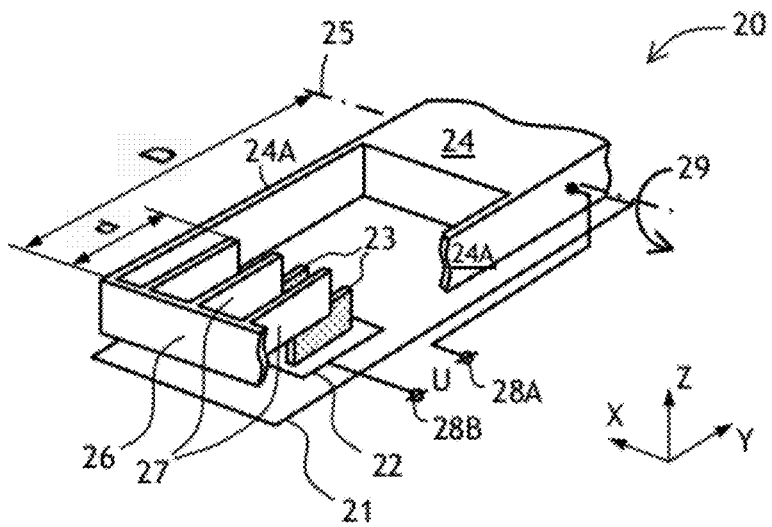
FIGS. 2A, 2B, and 2C are isometric, plan, and side views, respectively, of a comb actuator of the present invention, having partially disengaged comb fingers.
Figure 2B:
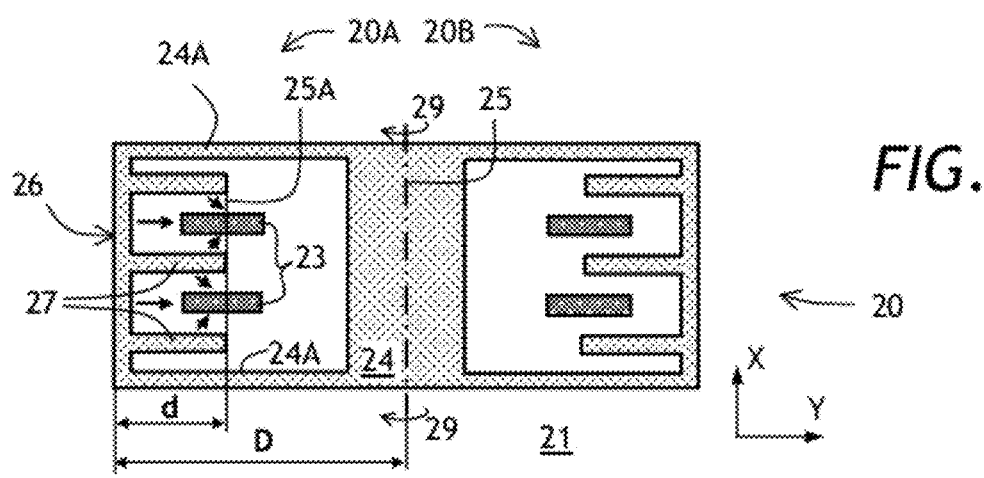
Figure 2C:
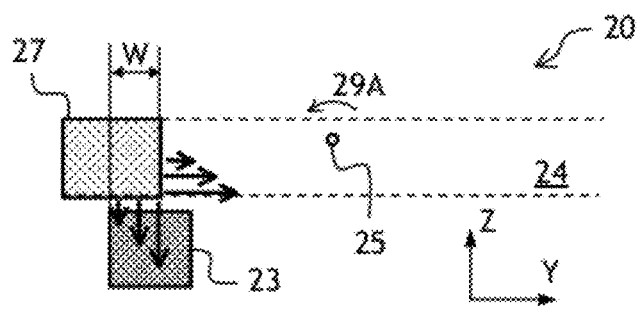

Referring to FIGS. 2A, 2B, and 2C, an electrostatic comb actuator 20 of the present invention is shown in isometric, plan, and side views, respectively. The electrostatic comb actuator 20 has a substrate 21, a stator electrode 22 having a plurality of stator fingers 23 extending from the substrate 21, and a tiltable platform 24 pivotally mounted over the substrate 21 for rotation about an axis of rotation 25. The pivotal mounting hinge is not shown in FIGS. 2A, 2B, and 2C for simplicity. The axis of rotation 25 of the tiltable platform 24 is parallel to the substrate 21 disposed in XY plane. The tiltable platform 24 has two support beams 24A, and a finger anchor wall 26 running parallel to the axis of rotation 25 at a distance D therefrom. The support beams 24A extend from the hinge, not shown, to the anchor wall 26. The support beams 24A extend substantially perpendicular to the axis of rotation 25. One of the support beams 24A is cut out in FIG. 2A to show the underlying stator fingers 23. The tiltable platform 24 has a plurality of rotor fingers 27 spaced apart along the anchor wall 26 and extending from the anchor wall 26 toward the axis of rotation 25. As seen in FIGS. 2A to 2C, the rotor fingers 27 extend for a distance d smaller than the distance D. The stator fingers 23 are spaced apart along a line 25A parallel to the axis of rotation 26. The stator fingers 23 extend from the substrate 21 towards the tiltable platform 24. The stator fingers 23 are disposed closer to the axis of rotation 25 than the anchor wall 26, so as to leave a horizontal clearance between the stator fingers 23 and the anchor wall 26. The horizontal clearance enables the rotor fingers 27 to rotate about the axis of rotation 25 without the stator fingers 23 contacting the anchor wall 26. As seen in FIG. 2B, the rotor fingers 27 are partially disengaged with the stator fingers 23, being shifted in a direction away from the axis of rotation 25.

In operation, a voltage U is applied between terminals 28A and 28B electrically coupled to the tiltable platform 24 and the stator electrode 22, respectively. The rotor and the stator fingers 27 and 23 attract each other electrostatically, causing the tiltable platform 24 to tilt about the axis of rotation 25 as shown at 29. Two actuator structures 20A and 20B of the actuator 20, symmetrical about the axis of rotation 25, are provided for tilting the rotor 24 in both directions.

In FIGS. 2A to 2C, the entire tiltable platform 24 acts as a tiltable rotor electrode having a uniform electrical potential. In the actuator 20, the terms "tiltable platform" and "rotor electrode" can be used interchangeably because they refer to the same element 24. A separate rotor electrode electrically insulated from the tiltable platform 24 can be used as well, even though the stator electrode plate 22 electrically insulated from the substrate 21 is much more common.

Components of the electrostatic force acting on the rotor fingers 27 are shown in FIGS. 2B and 2C with straight solid arrows. The electrostatic force generally has X, Y, and Z components. The Y and Z components of the electrostatic force shown in FIG. 2C create a useful torque indicated by an arrow 29A in FIG. 2C. A magnitude of the X component of the electrostatic force is proportional to a magnitude of a longitudinal overlap W between the stator and the rotor fingers 23 and 27, respectively. The longitudinal overlap W is an overlap between the stator and the rotor fingers 23 and 27 measured in Y-direction, which is the direction of the support beam 24A. As seen in FIG. 2C, the longitudinal overlap W is a length over which the rotor and the stator fingers 27 and 23 extend past each other. The X component of the electrostatic force is approximately proportional to the longitudinal overlap W. By reducing the longitudinal overlap W so as to achieve only partial interdigitation of the stator and the rotor fingers 23 and 27 upon rotation of the rotor fingers 27 in the direction 29A as shown in FIG. 2C, the X component of the electrostatic force can be reduced; therefore, undesired rotation of the platform 24 in the XY plane can be reduced.

It has been discovered that, while reduction of the longitudinal overlap W did cause reduction of the X component of the electrostatic force as expected, the other components did not decrease as much. Specifically, the Y and the Z components of the electrostatic force creating the useful torque did not decrease at all, or decreased significantly less than the X component. Due to this surprising and counter-intuitive effect, the comb actuator 20 exhibits reduced in-plane rotation of the platform 24, without a significant reduction of the useful torque 29A.

Figure 3A:
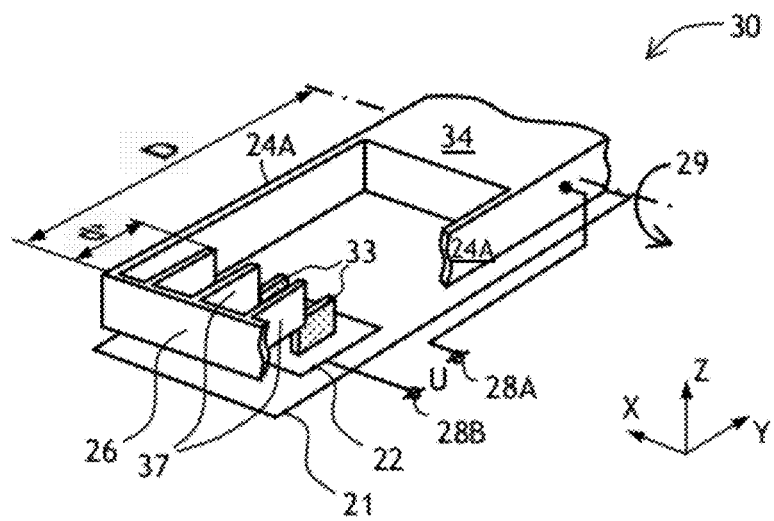
FIGS. 3A, 3B, and 3C are isometric, plan, and side views, respectively, of a comb actuator of the present invention, having completely disengaged comb fingers.
Figure 3B:
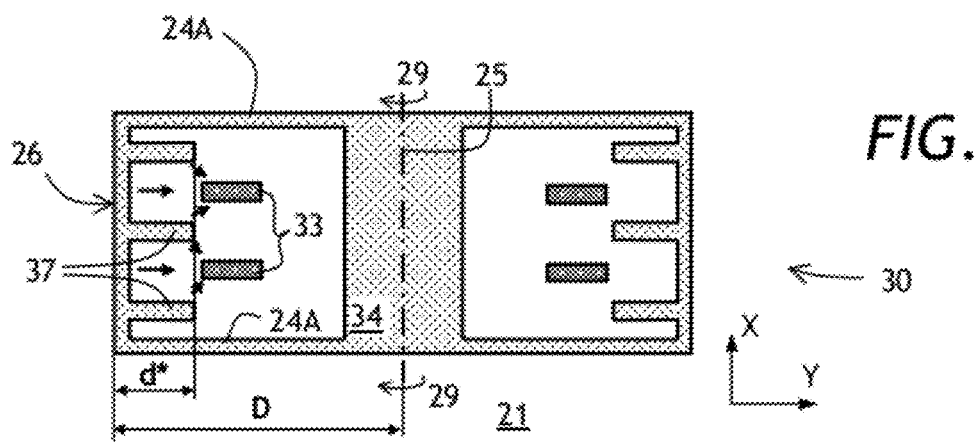
Figure 3C:
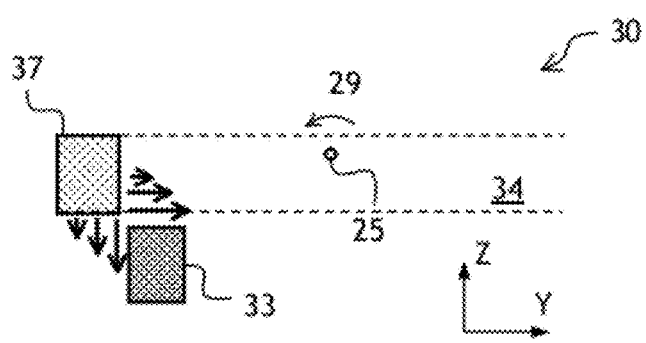

Turning now to FIGS. 3A to 3C, an electrostatic comb actuator 30 of another embodiment of the present invention is shown. The electrostatic comb actuator 30 has the same elements as the electrostatic comb actuator 20 of FIGS. 2A to 2C, with the exception that it has stator fingers 33 and a rotor 34 having rotor fingers 37. As seen in FIGS. 3B and 3C, a distance d* is short enough so that the stator and the rotor fingers 33 and 37 are completely disengaged. In other words, the stator and the rotor fingers 33 and 37 do not overlap longitudinally and never interdigitate, either at normal position, when substantially zero voltage is applied between the stator and the rotor fingers 33 and 37, or in a tilted position, when a non-zero voltage is applied. When the stator and the rotor fingers 33 and 37 do not overlap longitudinally, the undesired rotation of the platform 24 in the XY plane is greatly reduced. Surprisingly, even in this case the useful torque due to the Y and the Z components of the electrostatic remains substantial. As a result, the actuator 30 has a strong electrostatic pull with negligible in-plane rotation.

Referring to FIGS. 4A to 4D, the comb actuator 20 of FIGS. 2A to 2C, the comb actuator 30 of FIGS. 3A to 3C, and comb actuators 40 and 50 are shown in a YZ-plane side view. The comb actuators 20, 30, 40, and 50 are shown side-to-side, so as to highlight differences in the relative rotor and stator finger positions therein. The positions of the fingers are shown relative to the axis of rotation 25 and relative to the top surface of the substrate 21. In the comb actuator 20 of FIG. 4A, the rotor finger 27 has a bottom side 27A, and the stator finger 23 has a top side 23A. The bottom side 27A of the rotor finger 27 is disposed higher relative to the substrate 21 than the top side 23A of the stator finger 23 at zero voltage between the rotor finger 27 and the stator finger 23. This disposition of the rotor and stator fingers 27 and 23 is called a "completely staggered" disposition. Further, the rotor finger 27 and the stator finger 23 have sides 27B and 23B, respectively, closest to the axis of rotation 25, the side 23B being closer to the axis of rotation 25 than the side 27B. As explained above, this geometry facilitates reduction of the in-plane rotation without sacrificing the useful torque in the direction 29.

Figure 4A:
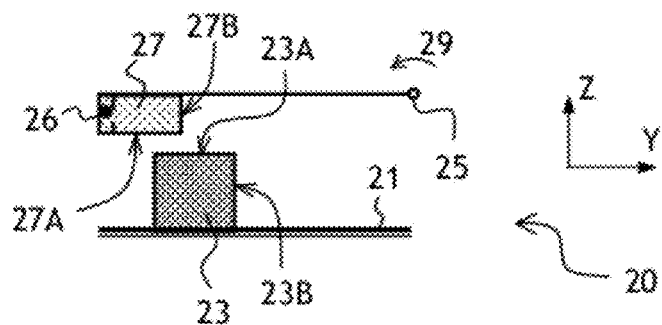
FIGS. 4A to 4D are side views of comb actuators of the present invention, showing relative positions of rotor and stator fingers.
Figure 4B:
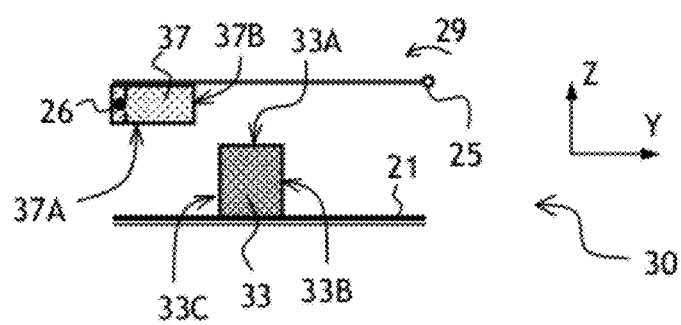

Referring to FIG. 4B, the rotor finger 37 and the stator finger 33 of the comb actuator 30 are shown. The rotor finger 37 and the stator finger 33 have sides 37B and 33B closest to the axis of rotation 25. The stator finger 33 further has a side 33C farthest from the axis of rotation 25. Both sides 33B and 33C of the stator finger 33 are closer to the axis of rotation 25 than the side 37B of the rotor finger 37. In the comb actuator 30, the stator and the rotor fingers 33 and 37 are also completely staggered, as indicated by the top surface 33A of the stator finger 33 being closer to the top surface of the substrate 21 than the bottom surface 37A of the rotor finger 37. Furthermore, the stator and the rotor fingers 33 and 37 do not extend past each other in Y-direction, being not interdigitated at zero voltage therebetween, or at any other voltage within a working voltage range of the electrostatic comb actuator 30. As noted above, this geometry results in a considerable reduction of the in-plane rotation, with an insignificant reduction of the useful torque in the direction 29.

Figure 4C:
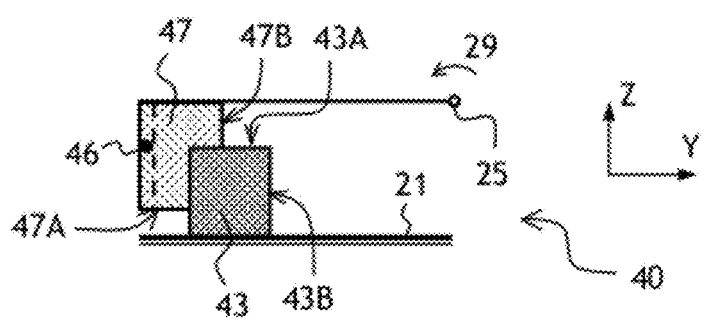

Turning now to FIG. 4C, a stator finger 43 and a rotor finger 47 of the comb actuator 40 are shown. The stator finger 43 and the rotor finger 47 extend from an anchor wall 46 towards the axis of rotation 25. The rotor finger 47 has a bottom surface 47A, and the stator finger 43 has a top surface 43A. One difference between the comb actuators 20 and 40 is that in the comb actuator 40, the top surface 43A of the stator finger 43 is disposed farther from the top surface of the substrate 21 than the bottom surface 47A of the rotor finger 47 at zero voltage between the rotor finger 47 and the stator finger 43. This disposition of the rotor and stator fingers 47 and 43 is called a "partially staggered" disposition.

Figure 4D:
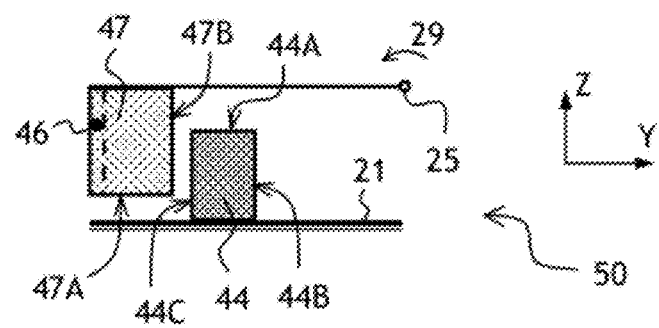

Turning to FIG. 4D, the actuator 50 is shown in a side view. A stator finger 44 of the actuator 50 has a top side 44A and a closest to and a farthest from the axis 25 sides 44B and 44C, respectively. The comb actuator 50 is partially staggered, like the comb actuator 40. The stator and the rotor fingers 44 and 47 of the comb actuator 50 do not extend past each other in Y-direction, being not interdigitated at zero voltage therebetween, or at any other voltage within a working voltage range of the electrostatic comb actuator 50.

The comb actuators 20, 30, 40, and 50 are shown as having a plurality of the rotor and the stator fingers in form of vertical planar parallel plates disposed perpendicular to the axis of rotation 25, extending towards each other. Other finger geometries are possible, including fingers formed in a planar rotor or stator, for example. The number of fingers can vary as well. As a minimum, at least one finger must be present in each of a rotor and a stator electrode. To reduce in-plane rotation, when one stator finger 23 is used, at least two rotor fingers 27 have to be used, the two rotor fingers 27 being disposed on both sides of the stator finger 23 and spaced apart along the anchor wall 26. When one rotor finger 27 is used, at least two stator fingers 23 spaced apart along the line 25A parallel to the axis of rotation 25 can be used.

Figure 5A:
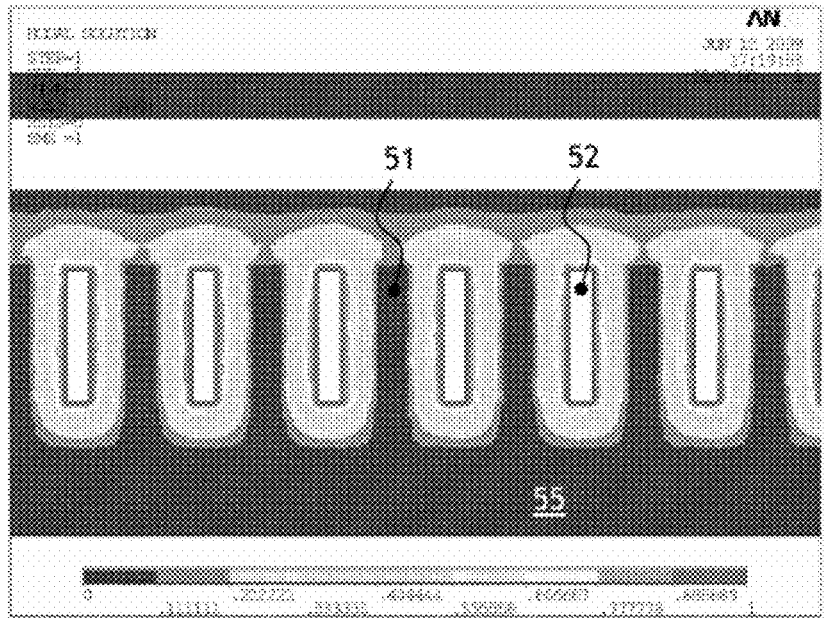
FIGS. 5A and 5B are electric potential and electric field distributions, respectively, of a comb actuator having interdigitated stator and rotor fingers.
Figure 5B:
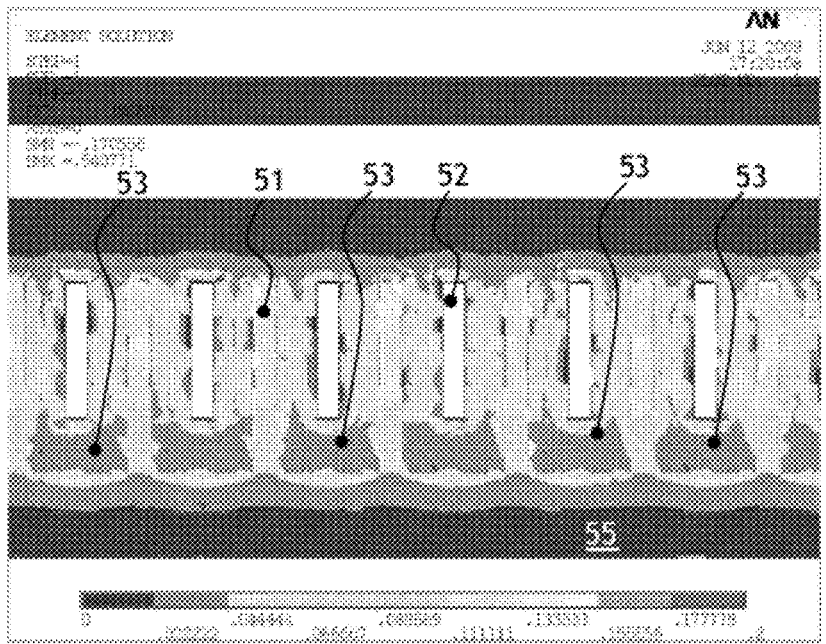

Referring to FIGS. 5A and 5B, computer-simulated electric potential and electric field distributions of a completely interdigitated comb actuator are shown, respectively. In FIG. 5A, the areas of identical shading correspond to the areas of equal electrical potential. Areas 51 correspond to rotor fingers, areas 52 correspond to stator fingers, and an area 55 corresponds to an anchor wall, such as the anchor wall 26. In FIG. 5B, the areas of identical shading correspond to areas of equal electrical field. The areas contiguous with the areas 51 correspond to a local electrostatic force exerted on the stator finger, because the electrical potential of the stator is the same across all the stator fingers. One can see from FIG. 5B that the force is mostly generated in areas 53 disposed next to and under the stator fingers areas 51. Thus, the force is concentrated near the stator finger tips and near the anchor wall. This indicates that the presence of the anchor wall increases the electrostatic force. The rotor finger tips proximate to the pivot contribute less to the electrostatic force than the stator finger tips.

Figure 6A:
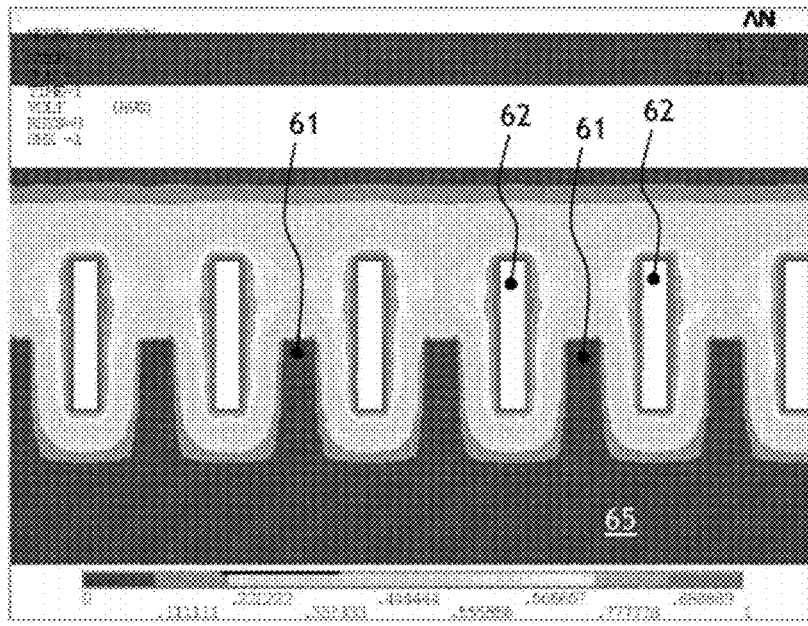
FIGS. 6A and 6B are electric potential and electric field distributions, respectively, of the comb actuator of FIGS. 2A to 2C and FIG. 4A.
Figure 6B:
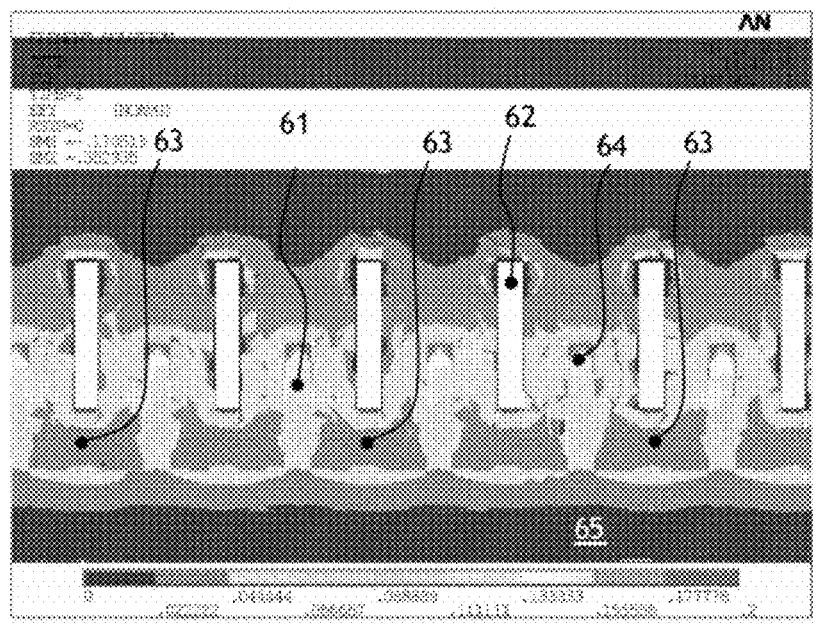

Referring now to FIGS. 6A and 6B, the electric potential and the electric field distributions are shown for a case of a comb actuator having partially longitudinally overlapping rotor and stator fingers, such as the actuator 20 of FIGS. 2A to 2C and FIG. 4A. Areas 61 correspond to the rotor fingers 27, areas 62 correspond to stator fingers 23, and an area 65 corresponds to an anchor wall 26. The force is mostly generated in areas 63 in FIG. 6B disposed next to and under the stator fingers 23. The force is also generated in areas 64 disposed next to and under the rotor fingers 27. Therefore, the force is concentrated near the finger tips and the anchor wall 26.

Figure 7A:
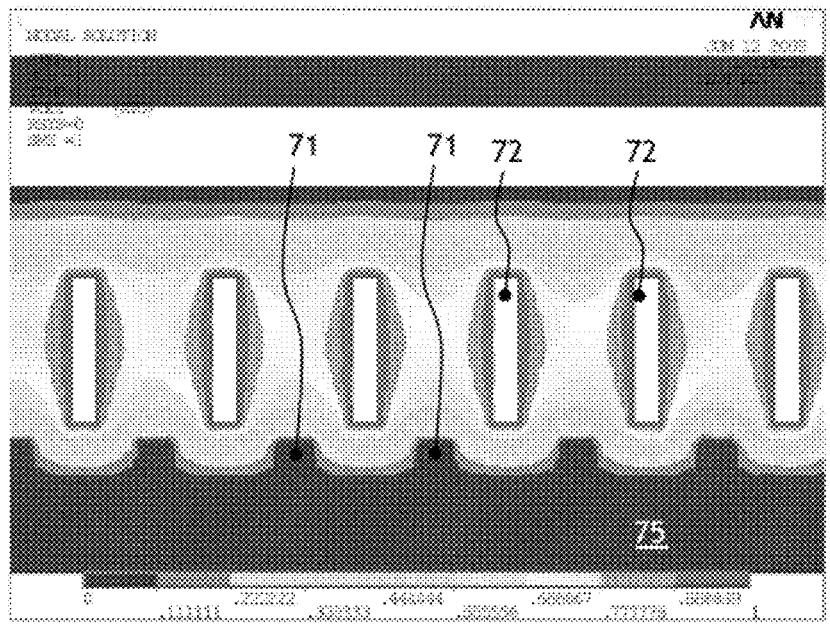
FIGS. 7A and 7B are electric potential and electric field distributions, respectively, of the comb actuator of FIGS. 3A to 3C and FIG. 4B.
Figure 7B:
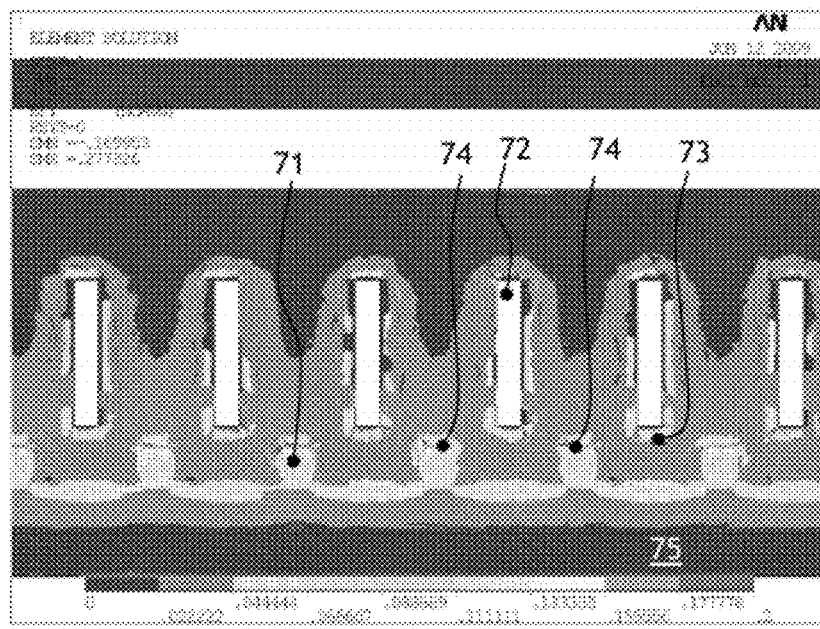

Turning now to FIGS. 7A and 7B, the electric potential and the electric field distributions are shown for a case of a comb actuator with longitudinally not overlapping fingers, such as the actuator 30 of FIGS. 3A to 3C or FIG. 4B. Areas 71 correspond to the rotor fingers 37, areas 72 correspond to the stator fingers 33, and area 75 corresponds to the anchor wall 26. The electrostatic force is mostly generated in areas 73 and 74 disposed next to and under the stator fingers 33 and rotor fingers 37, respectively.

Figure 8:
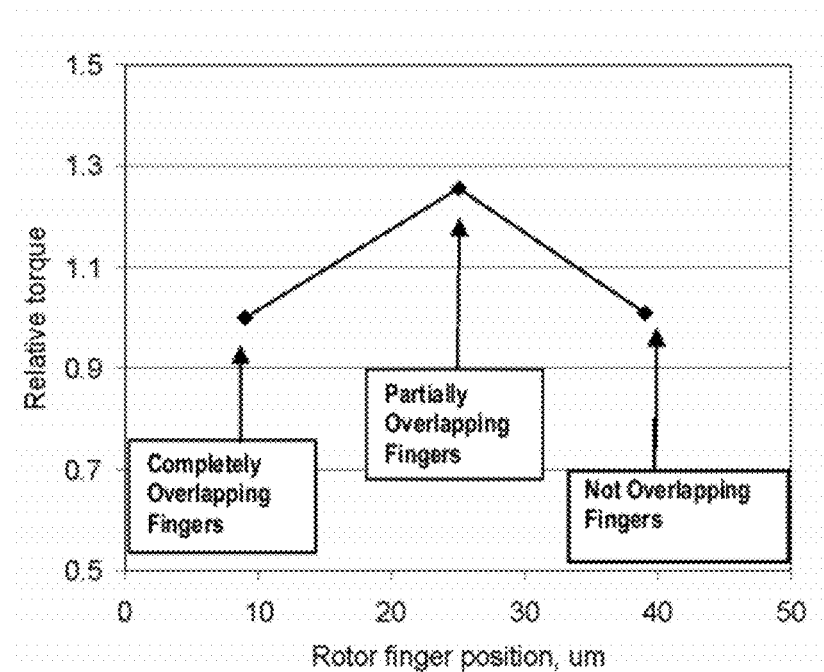
FIG. 8 is a plot of a torque by the comb actuators of FIGS. 4A and 4B as a function of rotor finger position.

Turning to FIG. 8, a graph showing a calculated torque as a function of rotor finger position of the comb actuators 20 and 30 is presented. A first position of the rotor of about 9 microns corresponds to a case of a comb actuator having completely longitudinally overlapping rotor and stator fingers, corresponding to the potential and field distributions of FIGS. 5A and 5B. A second position of the rotor of about 26 microns corresponds to a comb actuator having partially longitudinally overlapping rotor and stator fingers, such as the comb actuator 20 of FIGS. 2A and 2C and FIG. 4A having the rotor and the stator fingers 27 and 23, respectively. This position of the rotor corresponds to the electric potentials and fields displayed in FIGS. 6A and 6B. A third position of the rotor of about 40 microns corresponds to a comb actuator having longitudinally not overlapping rotor and stator fingers, such as the comb actuator 30 of FIGS. 3A to 3C and 4B having the rotor and the stator fingers 37 and 33, respectively. Surprisingly, the maximum torque is produced by the comb actuator 20 having partially longitudinally overlapping rotor and stator fingers 27 and 23, the torque values of the fully overlapping fingers actuator and the not overlapping fingers actuator 30 being very close in magnitude and lower than the torque value of the partially longitudinally overlapping fingers actuator 20. Thus, the partially overlapping fingers actuator 20 has an optimized useful torque and a decreased in-plane rotation simultaneously. The field concentration in the areas 53, 63 and 64, and 73 and 74 at the finger tips increases the torque, in part due to the leverage being at maximum at the finger tips. In the comb actuator 30 of FIGS. 3A to 3C and 4B having longitudinally not overlapping fingers, the electric field concentration effect is present to a lesser extent. However, because it occurs at a farther distance from the axis of rotation 25, the torque generated is still appreciable.

Figure 9:
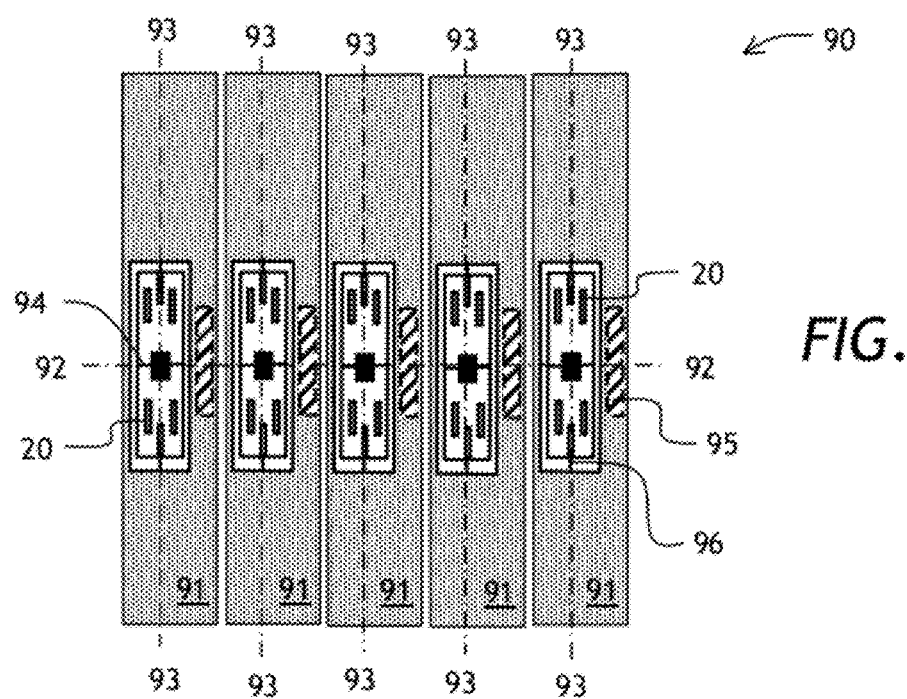
FIG. 9 is a plan view of an array of tiltable micromirrors, each micromirror having a comb actuator of FIGS. 2A to 2C.

Referring now to FIG. 9, a plan view of an array 90 of tiltable micromirrors 91 of the present invention is shown. Each micromirror 91 of the array 90 is tiltable about two mutually orthogonal tilt and roll axes 92 and 93, the axis 92 being a common axis. Each tiltable micromirror 91 has the electrostatic comb actuator 20 for tilting the micromirrors 91 about the tilt axis 92, defined by tilt hinges 94. Reduced in-plane rotation allows a denser placement of the micromirrors 91 in the array 90. The actuators 30, 40, and 50 can also be used to tilt the micromirrors 91 about the tilt axis 92. A conventional parallel plate actuator 95 can be used to rotate each micromirror about the roll axis 93, defined by roll hinges 96; however, the actuators 20, 30, 40, and 50 also can be used in place of actuators 95, for tilting the micromirrors 91 about the roll axes 93. Of course, the actuators 20, 30, 40, and 50 can also be used for actuating micromirrors that are only tiltable about a single axis disposed in one- or two-dimensional arrays. The comb actuator 92 is disposed within a gimbal ring 99 coupling the tilt hinges 94 and the roll hinges 96, for mechanical decoupling of tilting the micromirrors 21 and the comb actuator 20 about the roll axis 93.

What is claimed is:

1. An electrostatic comb actuator comprising:
a substrate;
a stator electrode including a stator finger extending from the substrate; and
a rotor electrode pivotally mounted over the substrate for rotation about a first axis parallel to the substrate upon applying a voltage between the rotor and the stator electrodes, the rotor electrode including
an anchor wall running parallel to the first axis at a first distance therefrom, and
a rotor finger extending from the anchor wall toward the first axis for a second distance smaller than the first distance,
wherein the stator finger is disposed closer to the first axis than the anchor wall, to enable the rotor finger to rotate about the first axis without the stator finger contacting the anchor wall.

2. The comb actuator of claim 1, further comprising a hinge for pivotally mounting the rotor electrode above the substrate about the first axis, and a support beam extending between the hinge and the anchor wall.

3. The comb actuator of claim 2, wherein the rotor and the stator fingers overlap in a direction of the support beam.

4. The comb actuator of claim 2, wherein the rotor finger and the stator finger each have a first side closest to the first axis, and wherein the first side of the stator finger is closer to the first axis than the first side of the rotor finger.

5. The comb actuator of claim 4, wherein the stator finger has a second side farthest from the first axis, and wherein the second side of the stator finger is closer to the first axis than the first side of the rotor finger, so that the stator and the rotor fingers do not overlap in a direction of the support beam.

6. The comb actuator of claim 1, wherein the stator finger extends from the substrate upwardly toward the rotor.

7. The comb actuator of claim 1, wherein the rotor finger extends from the anchor wall toward the stator.

8. The comb actuator of claim 1, wherein each of the rotor and the stator fingers have a top surface, and wherein the top surface of the rotor finger is disposed farther from the top surface of the substrate than the top surface of the stator finger at zero voltage between the rotor and the stator.

9. The comb actuator of claim 8, wherein the rotor finger has a bottom surface, and wherein the bottom surface of the rotor finger is disposed farther from the top surface of the substrate than the top surface of the stator finger at zero voltage between the rotor and the stator.

10. The comb actuator of claim 1, wherein the rotor and the stator fingers are vertical planar parallel plates disposed perpendicular to the first axis.

11. The comb actuator of claim 10, wherein the rotor comprises a plurality of rotor fingers spaced apart along the anchor wall.

12. An electrostatic comb actuator comprising:
a substrate;
a tiltable platform pivotally mounted over the substrate for tilting about a first axis parallel to the substrate, the tiltable platform comprising:
a hinge mounted on the substrate for tilting the tiltable platform about the first axis,
a support beam extending from the hinge substantially perpendicular to the first axis, and
an anchor wall extending from the support beam, the anchor wall running parallel to the first axis at a first distance therefrom;
a stator electrode having a stator finger extending from the substrate toward the tiltable platform; and
a rotor electrode having a rotor finger extending from the anchor wall toward the first axis for a second distance smaller than the first distance,
wherein the tiltable platform is pivotally mounted for rotation upon applying a voltage between the stator and the rotor electrodes, and
wherein the stator finger is disposed closer to the first axis than the anchor wall, so as to leave a horizontal clearance between the stator finger and the anchor wall to enable rotation therebetween.

13. The comb actuator of claim 12, wherein the rotor finger and the stator finger each have a first side closest to the first axis, and wherein the first side of the stator finger is closer to the first axis than the first side of the rotor finger.

14. The comb actuator of claim 13, wherein the stator finger has a second side farthest from the first axis, and wherein the second side of the stator finger is closer to the first axis than the first side of the rotor finger, so that the stator and the rotor fingers do not overlap in a direction of the support beam.

15. The comb actuator of claim 12, wherein the rotor and the stator fingers are vertical planar parallel plates disposed perpendicular to the first axis.

16. The comb actuator of claim 15, wherein the rotor comprises a plurality of rotor fingers spaced apart along the anchor wall.

17. The comb actuator of claim 15, wherein the stator comprises a plurality of stator fingers spaced apart along a line parallel to the first axis.

18. A tiltable MEMS micromirror device comprising a micromirror and the electrostatic comb actuator of claim 12 for tilting the micromirror.

19. The tiltable MEMS micromirror device of claim 18, wherein the micromirror is tiltable about two mutually orthogonal axes, wherein the electrostatic comb actuator is for tilting the micromirror about one of the axes.

20. A linear array of tiltable MEMS micromirror devices of claim 18.

* * * * *